(12) United States Patent
La Forest et al.

(10) Patent No.: US 7,897,072 B2
(45) Date of Patent: Mar. 1, 2011

(54) DENSIFICATION OF CARBON FIBER PREFORMS WITH PITCHES FOR AIRCRAFT BRAKES

(75) Inventors: Mark L. La Forest, Granger, IN (US); Neil Murdie, Granger, IN (US); Allen H. Simpson, Buchanan, MI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/049,950

(22) Filed: Mar. 17, 2008

(65) Prior Publication Data

US 2009/0230582 A1    Sep. 17, 2009

(51) Int. Cl.
*C01B 31/00* (2006.01)
(52) U.S. Cl. ............... 264/29.5; 264/103; 264/29.1
(58) Field of Classification Search ............. 264/29.5, 264/103, 29.1
See application file for complete search history.

(56) References Cited

U.S. PATENT DOCUMENTS

| | | | |
|---|---|---|---|
| 4,297,307 | A | 10/1981 | Taylor |
| 4,318,955 | A | 3/1982 | Kulakov et al. |
| 5,057,254 | A | 10/1991 | Sohda et al. |
| 5,398,784 | A | 3/1995 | Haneda et al. |
| 5,439,080 | A | 8/1995 | Haneda et al. |
| 6,057,022 | A | 5/2000 | Purdy et al. |
| 6,077,464 | A | 6/2000 | Murdie et al. |
| 6,342,171 | B1 | 1/2002 | Murdie et al. |
| 6,432,538 | B1 | 8/2002 | Hiraoka et al. |
| 7,207,424 | B2 | 4/2007 | Huang et al. |
| 2004/0105969 | A1 | 6/2004 | Huang et al. |
| 2004/0113302 | A1 | 6/2004 | La Forest et al. |
| 2006/0261504 | A1* | 11/2006 | Simpson et al. ........... 264/29.1 |
| 2006/0279012 | A1 | 12/2006 | Simpson et al. |

FOREIGN PATENT DOCUMENTS

WO    WO-2005/116476 A2    12/2005

OTHER PUBLICATIONS

Extended European Search Report from corresponding EP Application No. 09 153 382.8, mailed Jul. 13, 2009, 5 pages.
European Examination Report from corresponding EP Application No. 09 153 382.8, mailed Jun. 1, 2010, 4 pages.

* cited by examiner

*Primary Examiner*—Christina Johnson
*Assistant Examiner*—Larry Thrower
(74) *Attorney, Agent, or Firm*—Shumaker & Sieffert, P.A.

(57) ABSTRACT

Low cost isotropic and/or mesophase pitch is used to densify carbon fiber preforms by VPI and/or RTM equipment in place of CVI/CVD processing, for reduced manufacturing cycle times and costs and reduced need for expensive densification equipment. The process includes: heat treating a carbon fiber preform; infiltrating the preform with a pitch feedstock by VPI and/or RTM; carbonizing the pitch-infiltrated carbon fiber preform at 1200-2450° C. with a hold time of 4 hrs to ensure the entire furnace reaches the max temperature; repetition of the pitch infiltration and carbonization steps until the density of the preform is about 1.7 g/cc or higher; and a final heat-treatment of the densified composite. Brake discs manufactured in this way have higher densities and better thermal characteristics, which result in improved mechanical properties and friction and wear performance as compared with conventional CVI/CVD-densified brake discs.

6 Claims, 1 Drawing Sheet

DENSIFICATION OF CARBON FIBER PREFORMS WITH PITCHES FOR AIRCRAFT BRAKES

FIELD OF THE INVENTION

This invention relates to the manufacture of carbon-carbon composite aircraft brake discs from carbon fiber preforms which are densified with pitch.

BACKGROUND/PRIOR ART

The brake discs of most wide-body commercial and military aircraft are made from carbon-carbon composites. Traditionally, C-C composites used as friction materials are produced by combining carbon fibers with a carbon matrix material that is deposited around the fibers using a Chemical Vapor Infiltration (CVI) process or a Chemical Vapor Deposition (CVD) process to provide the composites with the requisite density. Unfortunately, CVI/CVD processing is an expensive, capital intensive, and time-consuming process, frequently taking several months to complete. Therefore, there is a need for improvements to the densification procedure in the manufacture of C-C composite friction materials. Such desirable improvements would include reduction in capital investment, improvements to the mechanical and thermal properties of the composites, and improvement to the friction and wear performance of the friction material (e.g., aircraft brake discs) made from the composites.

US 2006l0279012 A1 (Simpson et al.) discloses a carbon fiber preform densification by pitch infiltration wherein the pitch infiltration step may be facilitated by the application of vacuum and/or pressure.

U.S. Pat. No. 4,318,955 (Kulakov et al.) discloses a method of making a carbon brake product wherein fibers are packed and then twice saturated with pyrocarbon, with a machining step therebetween, and heat treatment at 2000° C., to a final density of 1.75-1.8 g/cm.

U.S. Pat. No. 6,077,464 (Murdie et al.) discloses a method of making carbon-carbon composite materials which includes a variety of densification methods which may be used singularly or in various combinations. See e.g. column 4, lines 40-45.

U.S. Pat. No. 6,342,171 B1 (Murdie et al.) discloses a process of stabilizing a pitch-based carbon foam which includes densification of the foam with four cycles of combined VPI and PIC. See e.g. column 12, lines 8-40.

US 2004/0105969 A1 (Huang et al.) discloses manufacture of carbon composites which includes densification of the preform by resin or pitch via vacuum and pressure.

SUMMARY OF THE INVENTION

This invention provides a method of manufacturing a low cost carbon-carbon composite friction material using pitches. The method of the present invention comprises sequential steps (a) through (f) as follows.

Step (a) is the provision of a chopped fiber or nonwoven fabric-based carbon fiber preform of carbon-carbon composite material in the form of an aircraft brake disc. Step (b) is heat treating the annular brake disc carbon fiber preform at 1200-2540° C.

Step (c) is infiltrating the heat-treated preform with an isotropic pitch by employing vacuum pressure infiltration (VPI) or resin transfer molding (RTM) processing. The carbon-carbon composite brake disc preform may be densified with coal tar pitch to a density of approximately 1.3-1.4 grams per cubic centimeter in a first iteration of step (c). The pitch used in step (c) will normally be a low cost isotropic material (coal tar, petroleum, or synthetic). However, the pitch used in at least one iteration of step (c) may alternatively be a mesophase pitch.

Step (d) is carbonizing the resulting pitch-infiltrated carbon fiber preform at 1200-2540° C., e.g., at a temperature between about 1200 and 2000° C. in an inert nitrogen atmosphere or in a vacuum. Step (d) may include an optional stabilization step prior to carbonization to rigidize the pitch and prevent exudation from the preform during carbonization. Step (d) also may include an optional machining step after carbonization to enhance surface porosity in surface areas of the preform "Step (e)" consists of repeating steps (c) and (d) until the density of the preform is at least 1.7 g/cc. Thus, for example, the carbon-carbon composite brake disc preform may be densified with coal tar pitch to a density of approximately 1.75 grams per cubic centimeter in step (e). As noted above, one or two of the iterations in step (e) may include infiltration with a mesophase pitch.

Step (f) is heat-treating the resulting pitch-densified carbon fiber preform at 1200-2540° C., e.g., at a temperature between about 1200 and 2540° C. in an inert nitrogen atmosphere or in a vacuum.

BRIEF DESCRIPTION OF THE DRAWING

These and other aspects and features of embodiments of the present invention will be better understood after a reading of the following detailed description in connection with the attached drawing wherein.

DETAILED DESCRIPTION OF THE INVENTION

Figure 1:
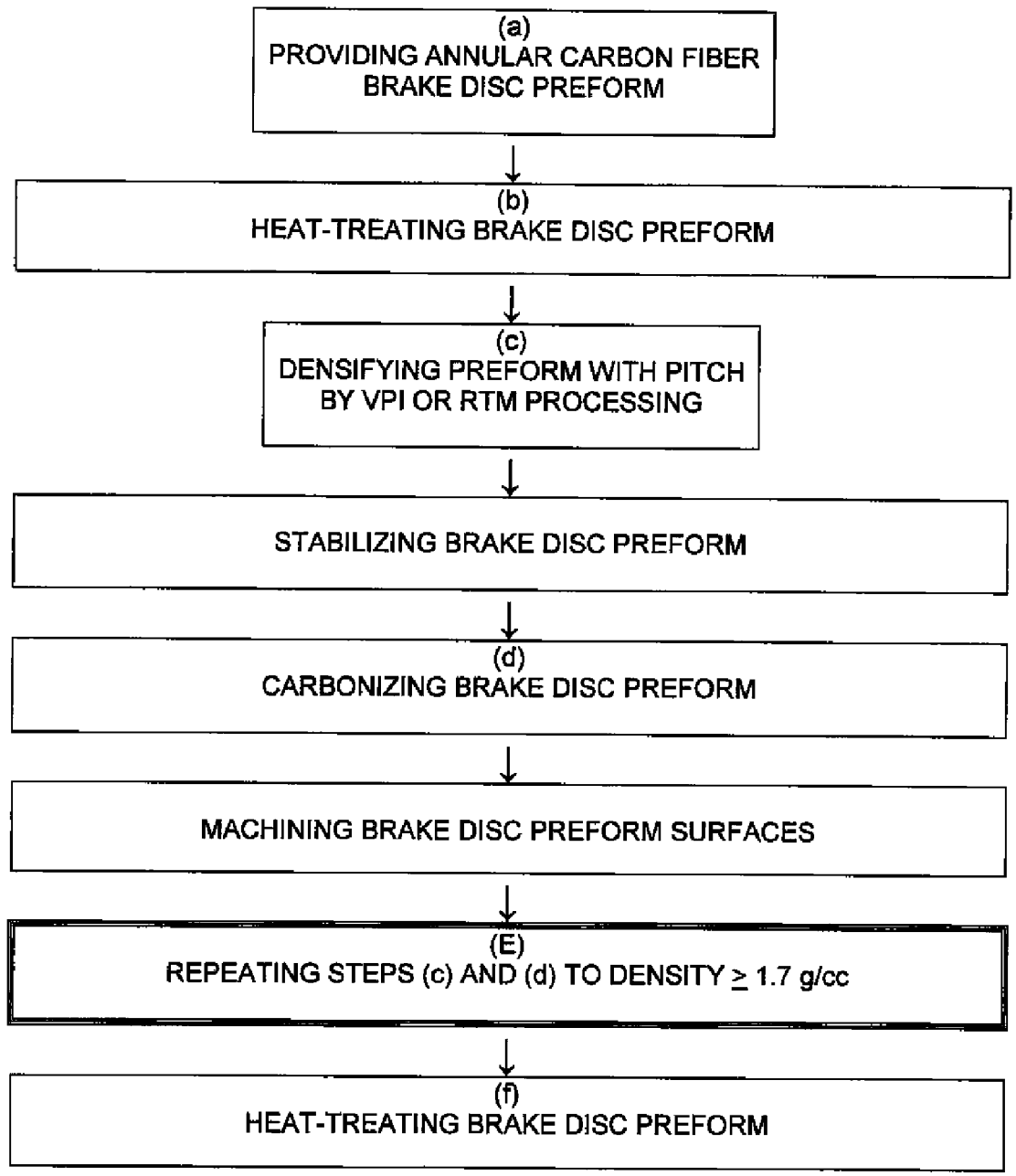
FIG. 1 depicts a flowchart illustrative of the sequential manufacturing process provided by the present invention.

This invention utilizes low cost isotropic and/or mesophase pitch feedstocks to densify carbon fiber preforms by VPI and/or RTM equipment in place of CVI/CVD processing, thereby providing reduced manufacturing cycle times and costs as well as reducing the need for expensive densification equipment. Brake discs manufactured in accordance with this invention have higher densities and better thermal characteristics. This results in improved mechanical properties and friction and wear performance as compared with conventional CVI/CVD-densified brake discs.

This invention may employ the sequential steps of: heat treating a chopped fiber or nonwoven fabric-based carbon fiber preform at 1200-2540° C.; infiltrating the preform with a pitch feedstock (coal-tar, petroleum, or synthetic) employing vacuum and pressure by VPI and/or RTM; an optional stabilization step to rigidize the pitch prior to carbonization; carbonizing the pitch-infiltrated carbon fiber preform at 1200-2450° C. with a hold time of 4 hrs to ensure the entire furnace reaches the max temperature; an optional machining step to open up the surface porosity using standard grinding equipment; repetition of the pitch infiltration and carbonization steps until the density of the preform is about 1.7 g/cc or higher; and heat-treating the densified composite between 1200-2450° C.

The present invention makes use of processing modules which are known in themselves. The advantages provided by the present invention lie in the selection and ordering of known processing modules to improve uniformity in the microstructure of the composite brake discs prepared in accordance with this invention. This invention thereby avoids variation in the friction and wear performance of the brake discs and improves their strength, oxidation resistance, etc. This invention also improves the economics of disc manufacture. Various "modules" that may be used in accordance with the present invention are summarized below.

Heat treatment. Intermediate and/or final heat treatment of the preforms is usually applied to modify the crystal structure and order of the carbon. Heat treatment is employed to modify the mechanical, thermal, and chemical properties of the carbon in the preform. Heat treatment of the preforms may be conducted in the range of 1600° to 2800° C. The effect of such a treatment on graphitizable materials is well known. Higher temperatures increase the degree of order in the material, as measured by such analytical techniques as X-ray diffraction or Raman spectroscopy. Higher temperatures also increase the thermal conductivity of the carbon in the products, as well as the elastic modulus.

VPI. Vacuum Pressure Infiltration ("VPI") is a well known method for impregnating a resin or pitch into a preform. The preform is heated under inert conditions to well above the melting point of the impregnating pitch. Then, the gas in the pores is removed by evacuating the preform. Finally, molten pitch is allowed to infiltrate the part, as the overall pressure is returned to one atmosphere or above. In the VPI process a volume of resin or pitch is melted in one vessel while the porous preforms are contained in a second vessel under vacuum. The molten resin or pitch is transferred from vessel one into the porous preforms contained in the second vessel using a combination of vacuum and pressure. The VPI process typically employs resin and pitches which possess low to medium viscosity. Such pitches provide lower carbon yields than do mesophase pitches. Accordingly, at least one additional cycle of pitch infiltration of low or medium char-yield pitch (with VPI or RTM processing) is usually required to achieve a final density of 1.7 g/cc or higher.

Carbonization. The carbonization process is generally well known to those skilled in the art. The pitch-infiltrated fiber preforms are heated in a retort under inert or reducing conditions to remove the non-carbon constituents (hydrogen, nitrogen, oxygen, etc.) from the fibers and matrix carbons. This process may be performed, for instance, by burying the foam preforms in a bed of activated carbon, enclosed in a superalloy retort with a sand seal. Carbonization of the infiltrated pitch can be carried out either in a furnace, a hot isostatic press, an autoclave, or in a uniaxial hot press. In each of these techniques, the impregnated part is heated to the range of 600° to about 1000° C., while maintaining an inert atmosphere in the pressure range of 1 to 1000 atmospheres. In one approach, for instance, the retort is purged gently with nitrogen for approximately 1 hour, then it is heated to 900° C. in 10-20 hours, and thence to 1050° C. in 1-2 hours. The retort is held at 1050° C. for 3-6 hours, then allowed to cool overnight. Carbonization can be carried out up to 1800° C. The higher the pressure, the higher the carbon yield achieved, although the biggest gains in carbon yield are achieved at moderate pressures up to 5000 psi.

Machining the surfaces of the preform. Standard machining processes, well know to persons skilled in the art of manufacturing carbon-carbon composite brake discs, are used in the manufacture of the carbon-carbon composite friction discs provided by the present invention. Between densification processing steps, the surfaces of the annular discs are ground down to expose porosity in the surfaces. Once the final density is achieved, the annular discs are ground to their final thickness using standard grinding equipment to provide parallel flat surfaces, and then the inside diameter and outside diameter regions are machined, typically using a CNC (computer numerical control) Mill to provide the final brake disc geometry, including such features as rivet holes and drive lugs.

EXAMPLES

The choice of pitch and impregnation equipment depends on the friction and wear application and the level of friction and wear requirements. Table 1 exemplifies various options for choice of pitches and processing equipment for different applications. For example, where cost is the critical key characteristic, the choice of pitch and equipment would consist of option A. However, where improved friction and wear performance is more critical than cost alone, the choice of options F-H are more suitable. In all options pursuant to the present invention, no CVI/CVD is utilized. Therefore all options in this invention are low cost options compared with conventional CVI/CVD densification processes.

TABLE 1

| Option | Preform Type | Carboniz. Temp | Infiltration Cycles (1), (2), (3) | Final Heat Treat. | Friction and wear performance |
|---|---|---|---|---|---|
| A | Chopped Fiber | 1600° C. | Iso Pitch/VPI<br>Iso Pitch/VPI<br>(3) Iso Pitch/VPI | 1200° C. | Standard |
| B | Chopped Fiber | 2000° C. | Iso Pitch/VPI<br>Meso Pitch/VPI<br>(3) Iso Pitch/VPI | 1800° C. | Standard |
| C | Chopped Fiber | 2540° C. | Iso Pitch/VPI<br>Meso Pitch/RTM<br>(3) Iso Pitch/VPI | 2000° C. | Standard |
| D | Chopped Fiber | 1800° C. | Iso Pitch/VPI<br>Iso Pitch/RTM<br>(3) Iso Pitch/VPI | 2540° C. | Standard |
| E | Non-woven | 1600° C. | Iso Pitch/VPI<br>Iso Pitch/RTM<br>(3) Iso Pitch/VPI | 1800° C. | Standard |
| F | Non-woven | 1800° C. | Meso Pitch/VPI<br>Iso Pitch/RTM<br>(3) Meso Pitch/VPI | 2000° C. | Improved |

TABLE 1-continued

| Option | Preform Type | Carboniz. Temp | Infiltration Cycles (1), (2), (3) | Final Heat Treat. | Friction and wear performance |
|---|---|---|---|---|---|
| G | Non-woven | 2000° C. | Meso Pitch/RTM Meso Pitch/RTM (3) Iso Pitch/VPI | 2200° C. | Improved |
| H | Non-woven | 2540° C. | Meso Pitch/RTM Meso Pitch/RTM (3) Iso Pitch/VPI | 2000° C. | Improved |

In addition to the above advantages, the density of the final carbon-carbon composite friction product produced by the present invention is typically >1.75 g/cc as compared to 1.7 g/cc for typical CVI-densified carbon-carbon composites. The density of the composites produced by the present invention is uniform through the thickness of the disc, so that stable friction and wear performance is provided throughout the life of the brake.

INDUSTRIAL APPLICABILITY

In terms of economics, densification of the preform with multiple cycles of isotropic pitch (e.g. coal-tar pitch) provides a low cost method of manufacturing a C-C composite for friction and wear applications. In terms of manufacturing economics, the hybrid composite concept embodied in the present invention enables the use of low cost pitch materials combined with low cost capitalization to produce carbon friction materials with consistent properties and friction and wear performance.

The present invention has been described herein in terms of a preferred embodiment. Additions and modifications to the disclosed piston and piston forming method will become apparent to those skilled in the relevant arts upon a reading of the foregoing disclosure. It is intended that all such obvious modifications and additions form a part of the present invention to the extent they fall within the scope of the several claims appended hereto.

What is claimed is:

1. A method of manufacturing a low cost carbon-carbon composite friction material using isotropic coal tar pitches, which method comprises the sequential steps:
   (a) providing a chopped fiber or nonwoven fabric-based carbon fiber preform in the form of an annular aircraft brake disc;
   (b) heat treating the annular fabric-based carbon fiber brake disc preform at 1200-2540° C.;
   (c-1) infiltrating said preform with an isotropic coal tar pitch by employing vacuum pressure infiltration (VPI) or resin transfer molding (RTM) processing;
   (d-1) carbonizing the resulting isotropic coal tar pitch-infiltrated carbon fiber preform at 1200-2540° C.;
   (c-2) infiltrating said preform with an isotropic coal tar pitch by employing vacuum pressure infiltration (VPI) or resin transfer molding (RTM) processing;
   (d-2) carbonizing the resulting isotropic coal tar pitch-infiltrated carbon fiber preform at 1200-2540° C.;
   (c-3) infiltrating said preform with an isotropic coal tar pitch by employing vacuum pressure infiltration (VPI) or resin transfer molding (RTM) processing;
   (d-3) carbonizing the resulting isotropic coal tar pitch-infiltrated carbon fiber preform at 1200-2540° C., whereby the density of the preform is at least 1.75 g/cc; and
   (f) heat-treating the resulting isotropic coal tar pitch-densified carbon fiber preform at 1200-2540° C. to produce said carbon-carbon composite friction material,
   wherein no CVI/CVD processing is utilized in the production of said carbon-carbon composite friction material.

2. The method of claim 1, wherein each of steps (d-1), (d-2), and (d-3) includes a stabilization step prior to carbonization to rigidize the pitch and prevent exudation from the preform during carbonization.

3. The method of claim 1, wherein each of steps (d-1), (d-2), and (d-3) includes a machining step after carbonization to enhance surface porosity in surface areas of the preform.

4. The method of claim 1, wherein the carbon-carbon composite brake disc preform is densified with said isotropic coal tar pitch to a density of approximately 1.3-1.4 grams per cubic centimeter in step (c-1).

5. The method of claim 1, wherein final heat-treatment step (f) is carried out at a temperature between about 1200 and 2540° C. in an inert nitrogen atmosphere or in a vacuum.

6. The method of claim 1, wherein each of carbonization steps (d-1), (d-2), and (d-3) is carried out at a temperature between about 1200 and 2000° C. in an inert nitrogen atmosphere or in a vacuum.

* * * * *